United States Patent
Chen et al.

(10) Patent No.: US 9,967,726 B2
(45) Date of Patent: May 8, 2018

(54) METHOD AND DEVICE FOR DETERMINISTIC DIRECTIONAL DISCOVERY OF WIRELESS DEVICES

(75) Inventors: Yi Chen, Croton-On-Hudson, NY (US);
Chun-Wei Hsu, Taipei (TW);
Chun-Ting Chou, Taipei (TW)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 156 days.

(21) Appl. No.: 13/696,654

(22) PCT Filed: Apr. 26, 2011

(86) PCT No.: PCT/IB2011/051813
§ 371 (c)(1),
(2), (4) Date: Nov. 7, 2012

(87) PCT Pub. No.: WO2011/141844
PCT Pub. Date: Nov. 17, 2011

(65) Prior Publication Data
US 2013/0059544 A1    Mar. 7, 2013

Related U.S. Application Data

(60) Provisional application No. 61/334,754, filed on May 14, 2010.

(51) Int. Cl.
*H04B 1/18* (2006.01)
*H04W 8/00* (2009.01)
(Continued)

(52) U.S. Cl.
CPC ............ *H04W 8/005* (2013.01); *H04W 16/28* (2013.01); *H04W 84/18* (2013.01)

(58) Field of Classification Search
CPC ............................... H04W 16/28; H04W 8/005
(Continued)

(56) References Cited

U.S. PATENT DOCUMENTS 5,966,670 A * 10/1999 Keskitalo ................. H04B 1/76
455/434
6,731,622 B1 * 5/2004 Frank .................... G01S 5/0215
370/342

(Continued)

FOREIGN PATENT DOCUMENTS

JP         2004120385 A     4/2004
WO    WO2008087595 A2    7/2008
(Continued)

OTHER PUBLICATIONS

Chun-Ting Chou, "On the Design of Medium Access Control for Multi-Gbps Wireless Networks in 60-GHz Bands", 6th IEEE Consumer Communications and Networking Conference, 2009. CCNC 2009., Jan. 10, 2009 (Jan. 10, 2009), pp. 1-5, XP031425443.

(Continued)

*Primary Examiner* — Nguyen Vo
*Assistant Examiner* — Rui Hu
(74) *Attorney, Agent, or Firm* — Larry Liberchuk

(57) ABSTRACT

A method for deterministic directional discovery of neighbor devices by a device in a wireless network comprises dividing equally an access time to a discovery channel to predefined number of sector scanning periods (410), wherein each sector scanning period includes a predefined number of discovery sweep periods (430), and each discovery sweep period includes a predefined number of time slots (440); scanning the discovery channel in a single sector during a current sector scanning period (S310); transmitting a discovery frame towards each sector during each time slot of each discovery sweep period of the current sector scanning period (S320); checking if at least one response to a transmitted discovery frame has been received during the current sector scanning period (S330); and setting the device to scan the discovery channel in a next sector during a next sector (Continued)

scanning period, thereby sequentially accessing the predefined number of sector scanning periods (S35).

11 Claims, 7 Drawing Sheets

(51) Int. Cl.
　　*H04W 16/28* (2009.01)
　　*H04W 84/18* (2009.01)
(58) Field of Classification Search
　　USPC .......... 455/63.4, 562.1, 575.7, 161.1–169.2
　　See application file for complete search history.

(56) References Cited

U.S. PATENT DOCUMENTS

| | | | | |
|---|---|---|---|---|
| 6,879,845 B2* | 4/2005 | Suzuki | ............ | H04W 16/28 370/321 |
| 7,596,387 B2* | 9/2009 | Goldberg | ............ | H04B 7/0491 342/367 |
| 7,684,802 B2* | 3/2010 | Jalali | ............ | H04W 36/0055 370/331 |
| 8,045,505 B2* | 10/2011 | Cheng | ............ | H04W 84/18 370/252 |
| 8,095,069 B2* | 1/2012 | Maltsev | ............ | H01Q 3/26 455/41.2 |
| 8,422,473 B2* | 4/2013 | Cheng | ............ | H04W 84/18 370/252 |
| 8,446,865 B2 | 5/2013 | Zhai | | |
| 8,509,130 B2* | 8/2013 | Liu | ............ | H04B 7/0695 342/367 |
| 8,767,620 B2* | 7/2014 | Kim | ............ | H04W 48/08 370/328 |
| 2002/0068590 A1* | 6/2002 | Suzuki | ............ | H04W 16/28 455/466 |
| 2004/0002363 A1* | 1/2004 | Cuffaro | ............ | H04B 7/04 455/562.1 |
| 2005/0003865 A1* | 1/2005 | Lastinger | ............ | H01Q 3/2605 455/562.1 |
| 2005/0026562 A1* | 2/2005 | Goldberg | ............ | H04B 7/0491 455/25 |
| 2005/0075141 A1* | 4/2005 | Hoffmann | ............ | H04B 7/0408 455/562.1 |
| 2008/0176561 A1* | 7/2008 | Shao | ............ | H04W 8/005 455/434 |
| 2008/0220808 A1* | 9/2008 | Jalali | ............ | H04W 36/0055 455/525 |
| 2009/0046653 A1* | 2/2009 | Singh | ............ | H04W 16/28 370/330 |
| 2009/0233549 A1* | 9/2009 | Maltsev | ............ | H01Q 3/26 455/41.2 |
| 2009/0270030 A1* | 10/2009 | Jia | ............ | H04B 1/1615 455/39 |
| 2010/0265924 A1* | 10/2010 | Yong | ............ | H04B 7/0695 370/336 |
| 2011/0110340 A1* | 5/2011 | Lakkis | ............ | H04W 74/08 370/336 |
| 2011/0170511 A1* | 7/2011 | Chen | ............ | H04W 72/02 370/329 |
| 2011/0170573 A1* | 7/2011 | Kim | ............ | H04W 48/08 375/130 |
| 2011/0205969 A1* | 8/2011 | Ahmad | ............ | H04W 16/28 370/328 |
| 2013/0059544 A1* | 3/2013 | Chen | ............ | H04W 8/005 455/67.11 |
| 2013/0188524 A1* | 7/2013 | Cheng | ............ | H04W 84/18 370/255 |

FOREIGN PATENT DOCUMENTS

| | | |
|---|---|---|
| WO | WO2008087596 A2 | 7/2008 |
| WO | WO2010033000 A2 | 3/2010 |

OTHER PUBLICATIONS

Zhou Lan et al: "On-Demand Device Discovery Enhancement of IEEE802.15.3 MAC for 60GHz WPAN System", IEEE 19th International Symposium on Personal, Indoor and Mobile Radio Communications, 2008. PIMRC 2008., Sep. 15, 2008 (Sep. 15, 2008), pp. 1-6, XP031371418.

"High Rate 60 GHz PHY, MAC and HDMI PAL", ECMA International, Standard ECMA-387, 1st Edition, Dec. 2008, pp. 181-183, Sec 15.5.1.

Zhou L. et al., "On-Demand Device Discovery Enhancement of IEEE 802.15.3 MAC for 60GHz WPAN System", Personal, Indoor and Mobile Radio Communications, PIMRC IEEE 19th Int'l Symposium, Sep. 18, 2008.

* cited by examiner

METHOD AND DEVICE FOR DETERMINISTIC DIRECTIONAL DISCOVERY OF WIRELESS DEVICES

The invention generally relates to device discovery in wireless networks, and more particularly, to techniques for deterministic directional discovery of devices in such networks.

Developed by Ecma International, the Ecma-387 is a standard for a 60 GHz physical (PHY) layer and medium access control (MAC) for short range communications. The standard provides a high rate wireless personal area network (WPAN) transport for both bulk rate transfer and multimedia streaming.

The Ecma-387 standard defines three device types "A", "B", and "C" that interoperate with their own types independently and that can coexist and interoperate with other types. The three device types are defined as follows: a type A device offers video streaming and WPAN applications in a 10-meter range line-of-sight/non-line-of sight (LOS/NLOS) multipath environments. A type A device uses high gain trainable antennas. A type B device offers video and data applications over shorter range (1-3 meters) point-to-point LOS links with non-trainable antennas. A type B device is considered as the "economy" device and trades off range and NLOS performance in favor of low cost implementation and low power consumption. A type C device supports only data applications over point-to-point LOS links at less than 1-meter range with non-trainable antennas and no Quality of Service (QoS) guaranties.

In the Ecma-387 MAC specification, there is a dedicated channel for device discovery and antenna beam forming. This channel is referred to as a discovery channel. A device transmits discovery frames in the discovery channel to discover neighbor devices. A discovery frame is transmitted in different PHY modes corresponding to the devices to be discovered. In the discovery channel, discovery frames are directionally transmitted using a directional antenna. To allow directional discovery, a randomized discovery procedure is proposed in the related art as illustrated in FIG. 1.

As shown in FIG. 1, initially a device transmits a set of discovery frames 110-1 using an antenna or beam facing toward a direction of transmission (hereinafter referenced as a "sector"). Thereafter, the device schedules another transmission of another set of discovery frames 110-2 at a time randomly drawn from a uniform distribution over the interval [mDBPMin, mDBPMax] measured from the start of the previous transmission of frames 110-1. The time period between transmissions of discovery frames 110-1 and 110-2 is a scan period 120-1. During a scan period the device scans one sector for the purpose of transmitting discovery frames or receiving responses transmitted by other devices. At the end of the scan period 120-1, the device switches to the next sector (sector 2) to transmit the next set of discovery frames 110-2 and to scan the discovery channel in a sector facing sector 2 for the duration of the scan period 120-2. The device continues to scan the M sectors and repeats the randomized discovery procedure until a response to the transmitted discovery frames is received.

The parameters mSPMin and mSPMax are, respectively, a minimum and maximum scan periods (DP) and measured as a number of superframes. A detailed discussion of the randomized discovery procedure with respect to the device types A, B and C can be found in pages 181 through 183, section 15.5.1, Standard Ecma-387, "High Rate 60 GHz PHY, MAC and HDMI PAL," 1$^{st}$ Edition, December 2008.

It should be noted that by randomly selecting the duration of the scan periods 120-1 through 120-M, there is high probability that the duration of each period will be different. The beginning of scan periods of different devices are not synchronized, i.e., the starting point for transmitting discovery frames is different from one device to another. This is further illustrated in FIG. 2 where scanning timelines 210 and 220 of two neighbor devices "A" and "B", respectively, are shown.

As shown in FIG. 2, the devices A and B are within the transmission range of each other, and each device transmits in four sectors discovery frames at randomized times. The device A starts scanning the discovery channel at $T_0$, while device B at $T_1$. The device A transmits discovery frames 211-A, 212-A, 213-A and 214-A in sectors 1, 2, 3, and 4 respectively. During scan periods 221-A through 224-A, the device A scans sectors 1 through 4, respectively. Similarly, the device B transmits discovery frames 211-B through 214-B in sectors 1 through 4, and during discovery periods 221-B through 224-B the device-B respectively scans sectors 1 through 4.

As illustrated in FIG. 2, discovery periods 221-B through 224-B of the device B do not overlap with discovery frames 211-A through 214-A of the device A. That is, the device B does not listen in a sector (direction) facing the transmitted frames, whereby any transmission by device A is not aligned with the direction of listening of device B. Therefore, by implementing the randomized discovery procedure devices may not be able to discover each other within a fixed amount of time.

Certain embodiments of the invention include a method for deterministic directional discovery of neighbor devices by a device in a wireless network. The method comprises dividing equally an access time to a discovery channel into a number of sector scanning periods (410), wherein each sector scanning period includes a predefined number of discovery sweep periods (430), and each discovery sweep period includes a predefined number of time slots (440); scanning the discovery channel in a single sector during a current sector scanning period (S310); transmitting a discovery frame towards each sector during each time slot of each discovery sweep period of the current sector scanning period (S320); checking if at least one response to a transmitted discovery frame has been received during the current sector scanning period (S330); and setting the device to scan the discovery channel in a next sector during a next sector scanning period, such that the sector scanning periods are sequentially accessed (S350).

Certain embodiments of the invention include further includes a device (700) for deterministic directional discovery of neighbor devices in a wireless network. The device comprises an array of directional antennas (710-1, 710-M) receiving and transmitting wireless signals in M different sectors; a receiver (720) scanning a discovery channel in M different sectors; a transmitter (730) transmitting discovery frames towards M different sectors; a controller (740) controlling the array of directional antennas, the receiver, and the transmitter for performing the deterministic directional discovery.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
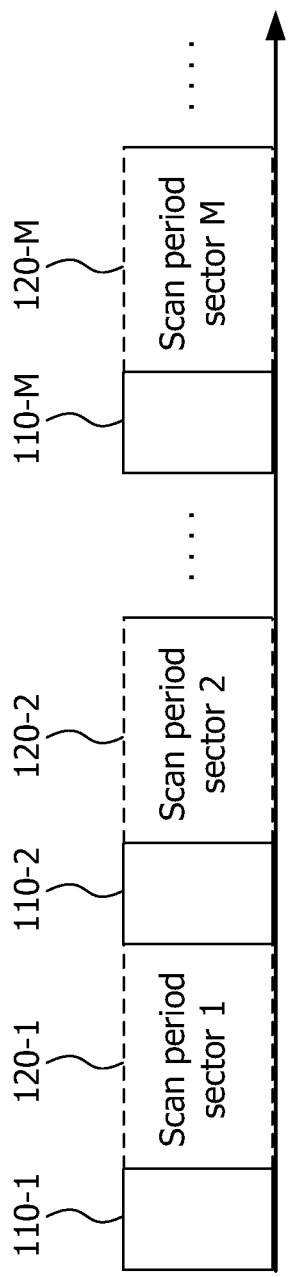
FIG. 1 illustrates a randomized discovery procedure in a related art.
Figure 2:
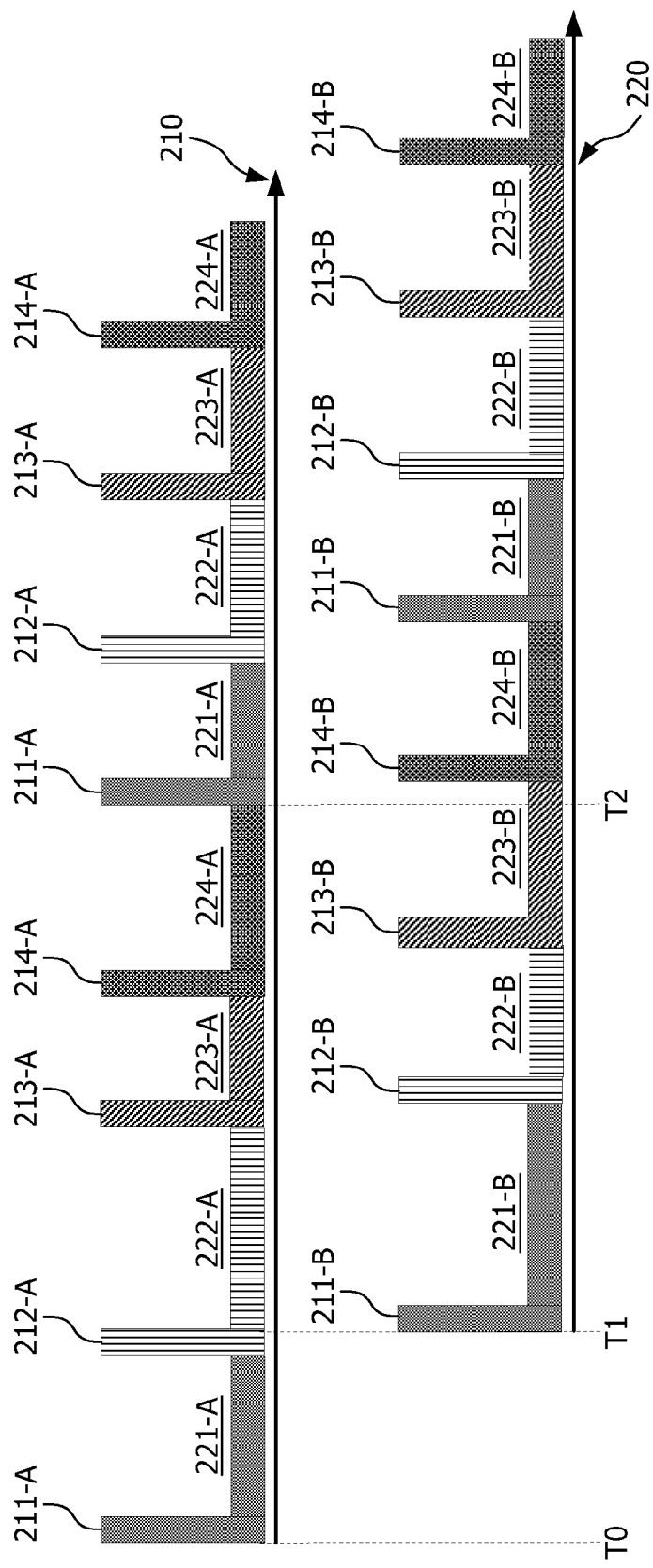
FIG. 2 illustrates limitations of the randomized discovery procedure in a related art.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
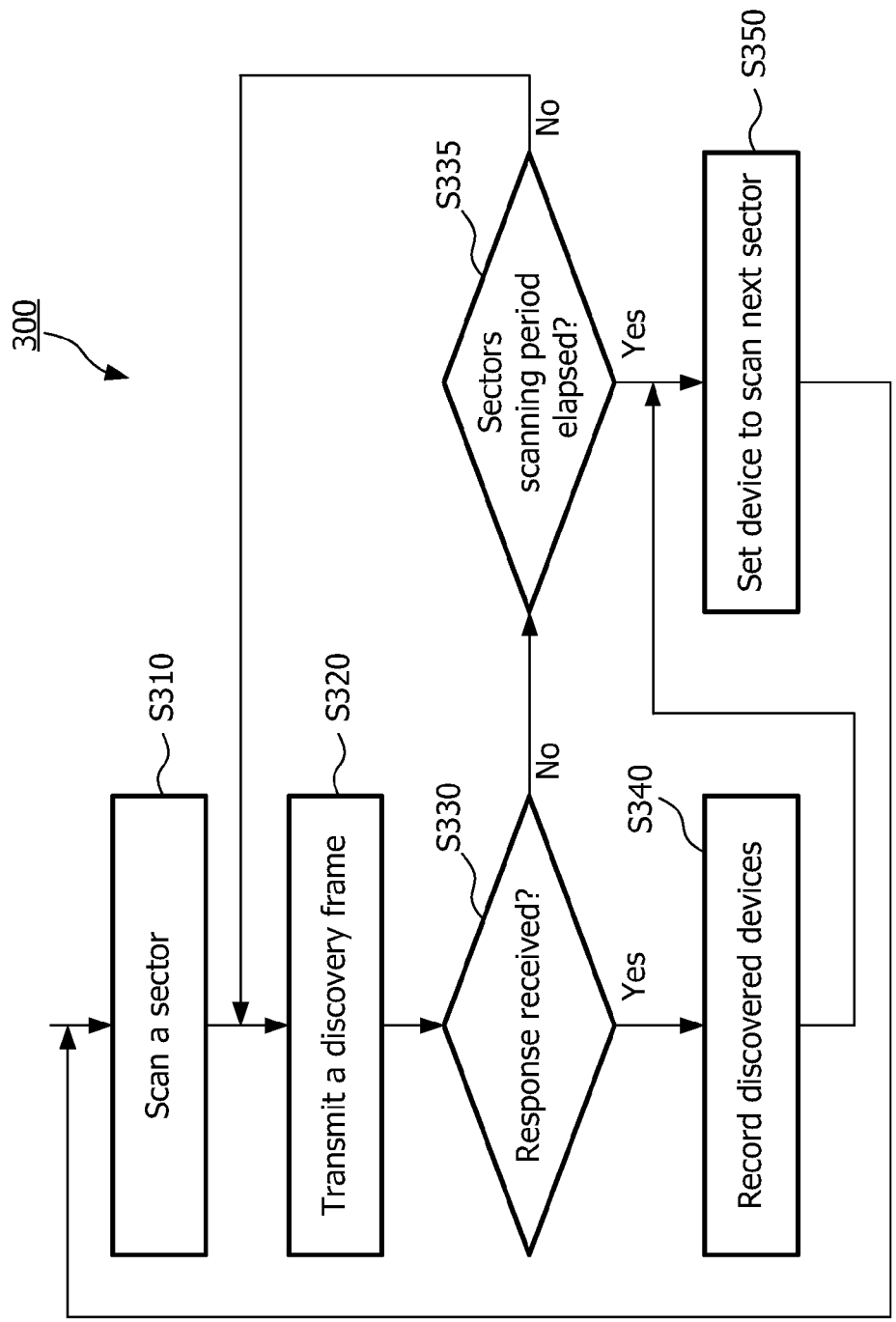
FIG. 3 is a flowchart illustrating a method for deterministic directional discovery in accordance with an embodiment of the invention.

FIG. 3 shows an exemplary and non-limiting flowchart 300 illustrating a method for deterministic directional discovery in accordance with an embodiment of the invention. The method performs scanning and discovery sweeping with a randomized starting time to achieve discovery within a bounded time. The method will be described with reference to FIG. 4 which illustrates a scanning timing structure.

Figure 4:
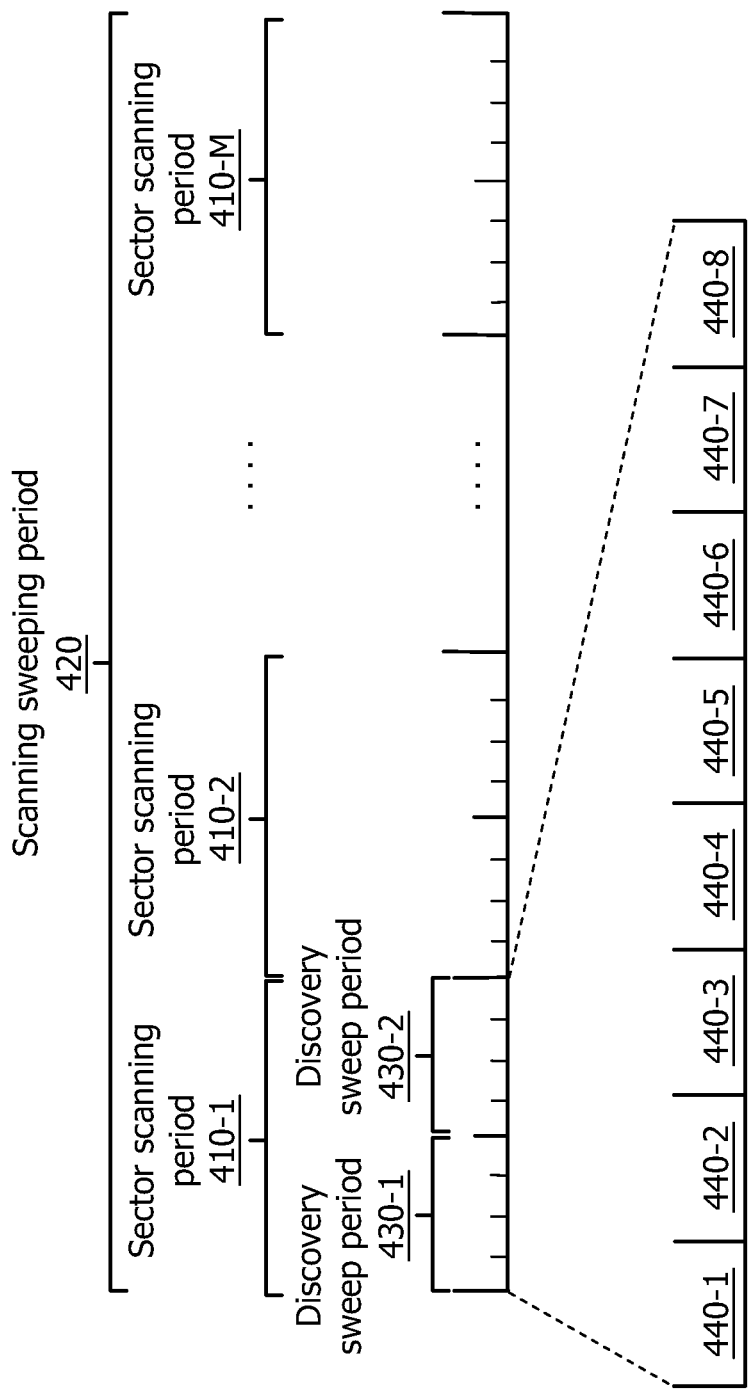
FIG. 4 illustrates a scanning timing structure in accordance with an embodiment of the invention.

At S310, in each sector, the device scans the discovery channel, in a single sector, during a sector scanning period 410-$i$ ($i=1, 2, \ldots, M$, where M is a total number sectors). The duration of each sector scanning period is $T_{scan}$. The period of time for scanning through the M sector scanning periods 410-$i$ is a scanning sweep period 420 having duration of $M*T_{scan}$. Each sector scanning period 410-$i$ is equally divided into $M*W$ time slots, where W is the number of discovery sweep periods within each sector scanning period 410-$i$. For exemplary purposes and without limiting the scope of the invention, FIG. 4 depicts two discovery sweep periods 430-1 and 430-2 (i.e., W=2) within the sector scanning period 410-1 and only time slots 440-1 through 440-8 (i.e., M=4) in the scanning sweep periods 430-1 and 430-2.

At S320, a discovery frame is transmitted in each time slot (e.g., time slot 440-1), in a direction of one of the M sectors. A discovery frame is sent after a randomly selected time interval from the beginning of the time slot. When transmitting another discovery frame in the next time slot (e.g., time slot 440-2), the device switches its antenna or beam to a different sector and randomly selects a time interval from the beginning of the time slot to transmit the frame. During a discovery sweep period (e.g., period 430-1), the device transmits discovery frames through all M sectors. In an embodiment of the invention, the time interval is randomly drawn from a uniform distribution over the interval [0, SlotDuration-delta], where SlotDuration is the duration of a slot, and delta is the estimated duration of a discovery frame.

In one embodiment of the invention, the discovery frames are transmitted using an asynchronous contention based medium access mechanism, such as carrier sense multiple access/collision avoidance (CSMA/CA), and the like. Upon transmitting of the discovery frame, the device continues to listen to the discovery channel for the remaining duration of a time slot.

At S330, a check is made to determine if a response to a transmitted discovery frame has been received. If so, execution continues with S340 where the device(s) that responded to a transmitted discovery frame and their sectors are recorded as discovered devices. Otherwise, at S335 it is checked if the current sector scanning period (e.g., 410-1) has elapsed. If not, execution returns to S320 to transmit another discovery frame in a different sector, thereby ensuring that the discovery frames are sent through all the discovery sweeping periods of the current sector scanning period. Otherwise, at S350, the device is set to scan a different sector during the next sector scanning period (e.g., 410-2). It should be noted that the device sequentially scans the M sectors and then, if one or more devices have been detected, the discovery method is terminated.

Figure 5:
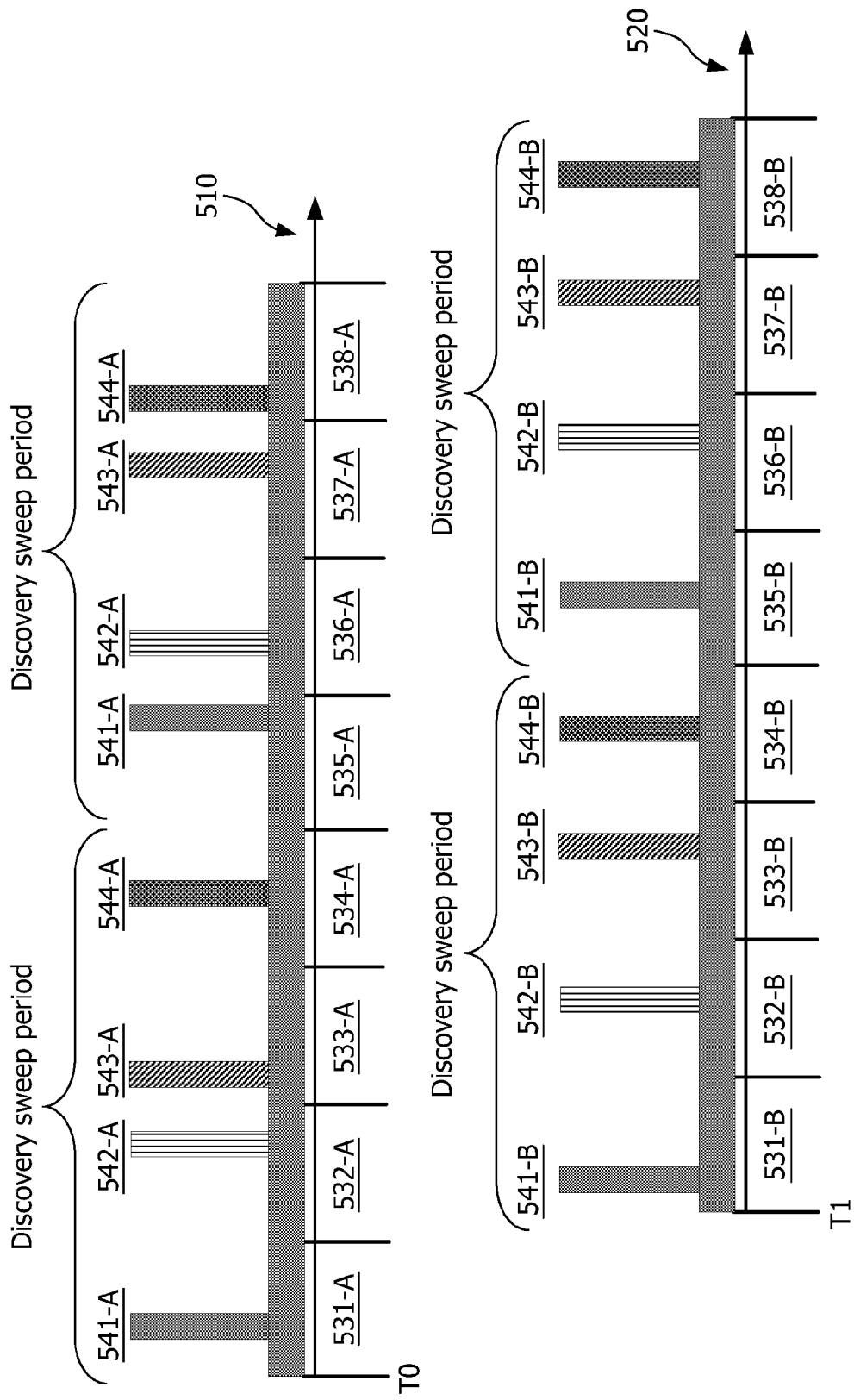
FIG. 5 are scanning timelines illustrating the operation of the deterministic directional discovery method in accordance with an embodiment of the present invention.

The operation of the deterministic directional discovery method is depicted in FIG. 5, where scanning timelines 510 and 520 of two neighbor devices "A" and "B", respectively, are shown. The devices are within the transmission range of each other, and each device can transmit in 4 different sectors. The device A starts scanning the discovery channel at $T_0$ while device B at $T_1$. During time slots 531-A through 534-A and 535-A through 538-A, the device A transmits discovery frames 541-A through 544-A in sectors 1 through 4 respectively, but scans a single sector (e.g., sector 1) during two discovery sweep periods. In a similar fashion, the device B sends discovery frames 541-B through 544-B in time slots 531-B through 534-B and 535-B through 538-B in sectors 1 through 4 respectively and scans only sector 1 during two discovery sweep periods. As the duration of a time slot is fixed for both devices, whenever the device B powers on, the device B listens to at least one sector that overlaps with discovery frames of device A. For example, device B receives the discovery frame transmitted by the device A during a time slot 535-A of the second discovery sweep. This frame is sent in the sector 1 to which device B listens. Therefore, the deterministic directional discovery method guarantees discovery of neighbor devices in a certain direction within a bounded time which equals to the sector scanning period and the discovery of devices in all sectors within the scanning sweeping period 420.

The embodiment described in FIG. 4 and illustrated in FIG. 5, is also referred to a slow-scan-fast-discovery-sweeping technique in which a device switches to a new sector at the end of a sector scanning period. In accordance with another embodiment of the invention, a fast-scan-slow-discovery-sweeping technique is disclosed. This technique includes scanning during each time slot a different sector and transmitting discovery frames only towards one sector for a duration of a sector scanning period. For example, assuming 4 sectors exist, during the sector scanning period (e.g., period 410-1, FIG. 4), the discovery frames are transmitted at each time slot (e.g., slots 440-1 through 440-4) in the direction of sector 1. In addition, at time slots 440-1 through 440-4 and 440-5 through 440-8, sectors 1 through 4 are scanned during the first discovery sweep period 430-1. The same applies to a second discovery sweep period 430-2 within the scanning period 410-4.

Figure 6A:
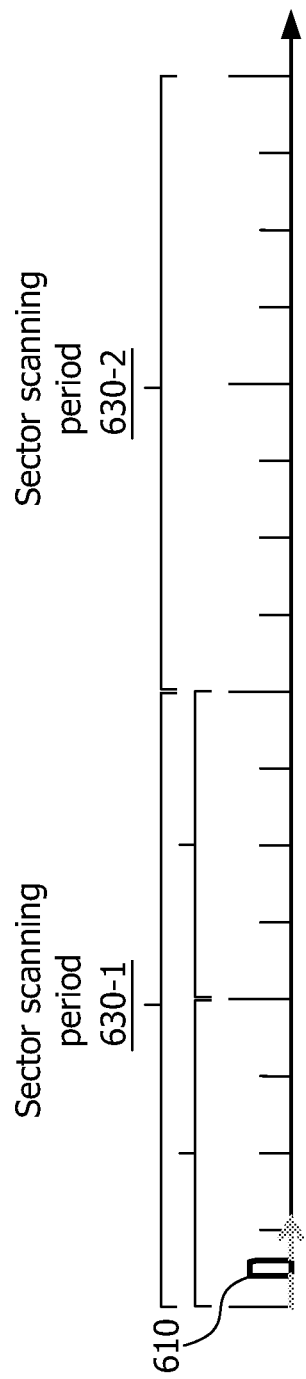
FIGS. 6A and 6B illustrate the deterministic directional discovery method in Ecma-387 type A based systems.
Figure 6B:
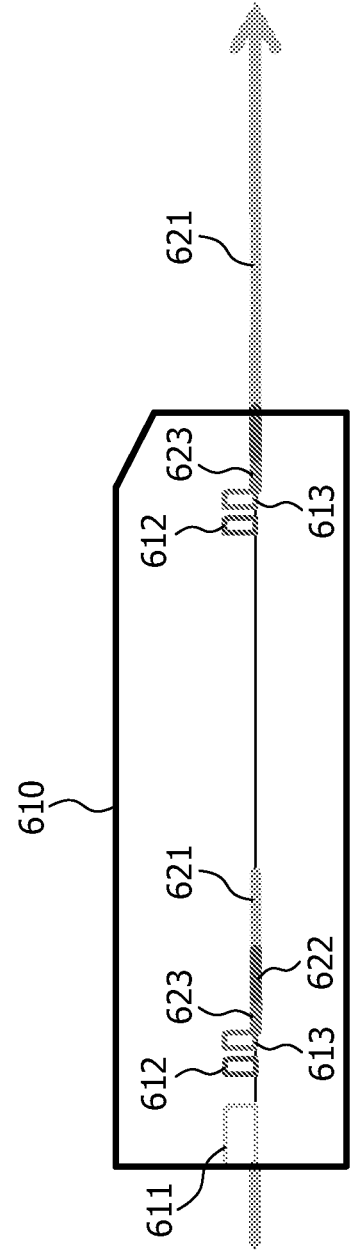

In accordance with an embodiment of the invention, the teachings disclosed herein can be implemented in Ecma-387 type A based systems. This embodiment is depicted in FIGS. 6A and 6B. In order to ensure interoperability among different types of devices, a type A device in Ecma-387 based systems is required to discover devices of types A, B and C. Therefore, a discovery frame of a type A device also includes type B and type C discovery (or polling) frames. As shown in FIG. 6B, the discovery frame is constructed as a type A discovery beacon blocks (DBBS) and includes a mode-D0 beacon 611, mode-B0 poll frames 612, mode-C0 poll frames 613 and corresponding scanning periods 621, 622, 623. Specifically, the number of mode-B0 and mode-C0 poll frames 612 and 613 is equal to the number of sectors the device is capable of covering using a number of antenna blocks or beams. A poll frame block consists of the transmission of a mode-B0 poll frame or a mode-C0 poll frame in the same sector and scanning for mode-C0 and mode-B0 poll responses during the scanning periods 622 and 623 in the reversed order in which poll frames were transmitted.

In the exemplary diagram shown in FIG. 6A, the device scans 4 sectors. In each time slot, the type A device transmits the same discovery frame 610, but in a different sector. A discovery frame 610 is sent at a randomized time after the beginning of time slot. The device scans only one sector for the duration of a sector scanning period 630-1. The device scans the next sector during a sector scanning period 630-2. As there are 4 sectors, the device returns to the first sector after the fourth sector scanning (not shown).

Figure 7:
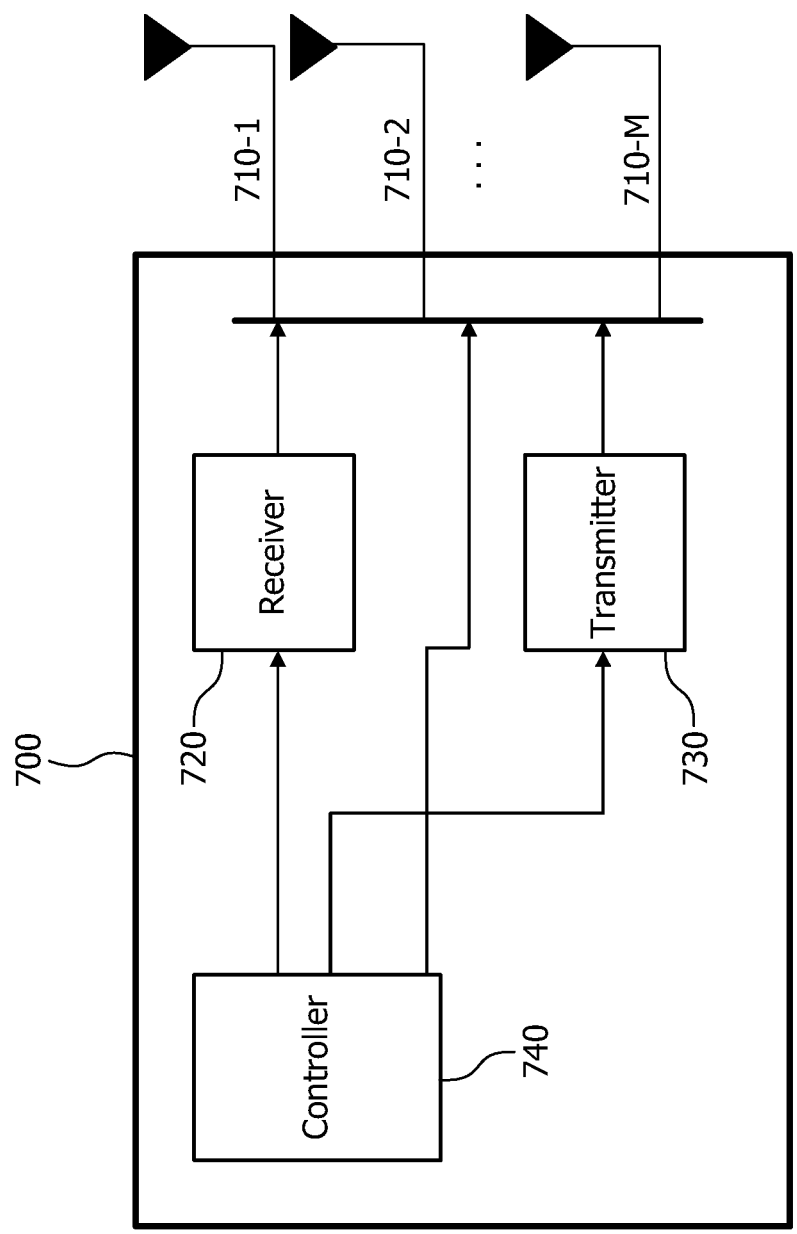
FIG. 7 is a block diagram of a device constructed in accordance with an embodiment of the invention.

FIG. 7 shows a block diagram of a device 700 constructed in accordance with an embodiment of the invention. The device 700 includes an array of directional antennas 710-1 through 710-M for receiving and transmitting signals towards M different sectors. The device 700 further includes a receiver 720 for at least scanning a discovery channel in M different sectors for detecting neighbor devices and a transmitter 730 for transmitting discovery frames towards M different sectors. The device 700 further includes a controller 740 for controlling the array of antennas 710-1 through 710-M, transmitter 730, and receiver 720 for performing the slow-scan-fast-discovery-sweeping technique or the fast-scan-slow-discovery-sweeping technique discussed in detail hereinabove.

Various embodiments of the invention can be used in short-range wireless networks and applications including, but not limited to, wireless HDMI, wireless USB, and the like.

The principles of the invention can be implemented as hardware, firmware, software or any combination thereof. Moreover, the software is preferably implemented as an application program tangibly embodied on a program storage unit, a non-transitory, computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A method for deterministic directional discovery of neighbor devices by a device in a wireless network, the neighboring devices being, when discoverable, in one of a total number of sectors of the device, each of the sectors representing a different direction and wherein an access time to a discovery channel is equally divided into a number of sector scanning periods, each of the sector scanning periods being further subdivided into a predefined number of time slots, the predefined number of time slots being equal to the total number of sectors times a predefined number of discovery sweep periods within each sector scanning period, the predefined number of discovery sweep periods being at least two, the method comprising:

transmitting, by the device, during each of the predefined number of time slots of each discovery sweep period of a current sector scanning period of the sector scanning periods, a discovery frame towards one of the total number of sectors such that during each discovery sweep period of the current sector scanning period each of the total number of sectors has a discovery frame transmitted toward it;

listening to, by the device, only one of the total number of sectors during the current sector scanning period to check if at least one response to a transmitted discovery frame has been received during the current sector scanning period; and setting the device to scan the discovery channel in a next one of the total number of sectors during a next sector scanning period, such that the sector scanning periods are sequentially accessed.

2. The method of claim 1, further comprising recording each device that responded to the transmitted discovery frame, and repeating periodically the scanning of the discovery channel through the number of sector scanning periods if no responses are received.

3. The method of claim 1, wherein a duration of each time slot of the predefined number of time slots is fixed.

4. The method of claim 1, wherein the number of sector scanning periods is equal to the number of sectors.

5. The method of claim 1, wherein the discovery frame is transmitted after a random time interval from a beginning of a time slot.

6. The method of claim 5, wherein the discovery frames are transmitted using an asynchronous contention based medium access mechanism.

7. The method of claim 1, further comprising transmitting in each time slot of a sector scanning period a discovery frame towards a single sector, and scanning the discovery channel in a different sector during each time slot of each discovery sweep period of the sector scanning period.

8. The method of claim 1, wherein the device is any one of: a type A Ecma-387 based device and a type B Ecma-387 based device, wherein the type A Ecma-387 based device is configured to support at least video streaming and user high gain trainable antennas, the type B Ecma-387 based device is configured to support at least video and data transmissions using non-trainable antennas.

9. The method of claim 8, wherein each of the neighbor devices is at least one of: a type A Ecma-387 based device, a type B Ecma-387 based device, and a type C Ecma-387 based device, wherein the type C Ecma-387 based device is configured to support data transmissions over point-to-point line-of-sight links using non-trainable antennas.

10. The method of claim 8, wherein the discovery frame is constructed as discovery beacon blocks (DBBS).

11. The method of claim 10, wherein the DBBS include a mode-D0 beacon, mode-B0 poll frames, mode-C0 poll frames, a mode-D0 scanning period, a mode-B0 scanning period, and a mode-C0 scanning period.

\* \* \* \* \*